United States Patent [19]
Shimura

[11] Patent No.: US 6,307,393 B1
[45] Date of Patent: Oct. 23, 2001

[54] DEVICE FOR DETECTING DEFECTS IN SOLID-STATE IMAGE SENSOR

[75] Inventor: Masayuki Shimura, Kanagawa (JP)

[73] Assignee: Sony Corporation, Tokyo (JP)

[*] Notice: Subject to any disclaimer, the term of this patent is extended or adjusted under 35 U.S.C. 154(b) by 0 days.

[21] Appl. No.: 08/783,518

[22] Filed: Jan. 14, 1997

[30] Foreign Application Priority Data

Jan. 19, 1996 (JP) .................................................. 8-007030

[51] Int. Cl.⁷ .................................................. G01R 31/00
[52] U.S. Cl. .......................... 324/765; 324/500; 348/246; 348/247
[58] Field of Search .................................. 324/765, 500, 324/750; 348/246, 247; 382/309

[56] References Cited

U.S. PATENT DOCUMENTS

| | | | | |
|---|---|---|---|---|
| 4,590,520 | * | 5/1986 | Frame | 358/163 |
| 5,392,070 | * | 2/1995 | Endo | 348/247 |
| 5,416,516 | * | 5/1995 | Kameyama | 348/246 |
| 5,436,659 | * | 7/1995 | Vincent | 348/246 |

* cited by examiner

Primary Examiner—Glenn W. Brown
(74) Attorney, Agent, or Firm—Frommer Lawrence & Haug, LLP.; William S. Frommer (57) ABSTRACT A device for detection of defects in a solid-state image sensor, comprising a timing generator for generating first and second read pulses to read out signal charges of first and second fields respectively from photo sensing elements disposed in the pixels of the image sensor; a controller for controlling the timing of generation of the first and second read pulses; and a defect detector supplied with the signal charges of the first and second fields stored in the image sensor and serving to detect any defective pixel by detecting the level of the signal charge in each pixel. During the defect detection period, the controller controls the timing generator in such a manner that the first read pulse is supplied to the image sensor after storage of the first-field signal charge for a time period of six fields, and also that storage of the second-field signal charge is started after a lapse of two fields from start of the storage of the first-field signal charge, and the second read pulse is supplied to the image sensor after storage of the second-field signal charge, whereby the defect detection can be performed in a time period of four fields.

8 Claims, 5 Drawing Sheets

DEVICE FOR DETECTING DEFECTS IN SOLID-STATE IMAGE SENSOR

BACKGROUND OF THE INVENTION

1. Field of the Invention

The present invention relates to a defect detecting device for detection of any defective pixel (spot) or photo sensing element in a solid-state image sensor, and more particularly to a device for detecting defects in a solid-state image sensor having an image pickup area larger than an effective image pickup area.

2. Description of the Related Art

In a solid-state image sensor composed of a semiconductor such as a CCD (Charge Coupled Device), there may be induced some defective pixels (photo sensing elements) where the sensitivity is lowered due to local crystal defects or the like of the semiconductor, or some other defective pixels derived from flaws and so forth. It is known that, if any of such pixel defects is existent, the picture quality is deteriorated by the image pickup output of the relevant defective pixel. Particularly in a CCD solid-state image sensor, white spot defects and the like are caused as pixel defects. And even in a dark condition where none of light is incident on a CCD solid-state image sensor, each white spot defect is observed in dimensional unit of a pixel on a screen.

A white spot defect, which is a subject to be detected and corrected in a CCD solid-state image sensor, is extremely low in level, and even a defect level of several mV or so at normal temperature raises a problem in ordinary reading. Since the level of a pixel defect that usually causes a problem is so extremely low, it is impossible to achieve simple detection of a defective pixel. However, if the signal is amplified to raise the detection sensitivity, the noise is also amplified together to consequently deteriorate the S/N. One of the methods proposed heretofore to enhance the detection sensitivity while retaining the S/N sufficiently high is carried out by forcibly increasing the time, which is predetermined for storage of signal in each photo sensing element (pixel), to a length far greater than a normal one. More concretely, at detection of a defect, the storage time is prolonged to ten and several fields in a frame read mode.

Meanwhile, for correcting a wobbling fault of a video camera derived from its unsteady manual hold, there is known a method of employing a solid-state image sensor which has an image pickup area larger than an effective image pickup area required in a normal image sensing mode, and using a portion of such image pickup area for correction of the wobbling fault derived from unsteady manual hold of the video camera. When detection of defective pixels is performed in a solid-state image sensor equipped with such a wobbling-fault correcting function, a time corresponding to two fields is allocated to the detection, since a time corresponding to more than one field is required for detecting defective pixels in one field due to the fact that the number of vertical lines is greater than that in the ordinary TV system.

Figure 5:
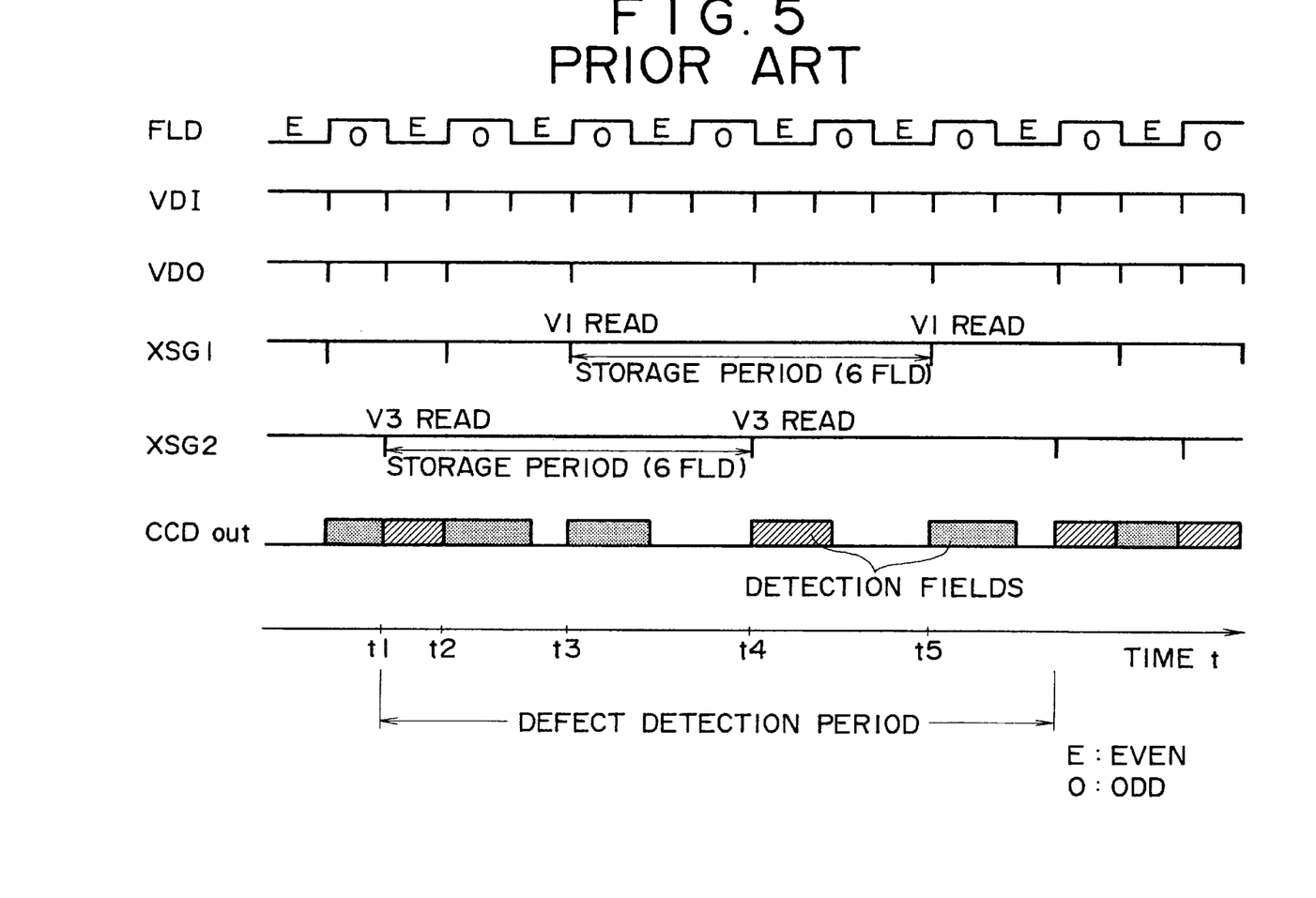
FIG. 5 is a timing chart of signals for explaining the operation of defect detection performed in a conventional example.

FIG. 5 shows the timing to drive an exemplary CCD solid-state image sensor in the related art and the waveform of a CCD output signal. In this example, a storage time is set to a period corresponding to six fields. In FIG. 5, FLD stands for an ODD/EVEN field discrimination signal, VDI for a vertical sync pulse, VDO for a read timing pulse synchronized with the vertical sync pulse, XSG1 for a read pulse superimposed on a first-phase vertical transfer pulse V1 of four-phase vertical transfer pulses V1–V4 to read out the signal charge of one field, XSG2 for a read pulse superimposed on a third-phase vertical transfer pulse V3 to read out the signal charge of the other field, and CCDout for a CCD output signal, respectively.

In FIG. 5, a read pulse XSG2 is generated at time point t1 to read out an even field, and then storage is performed with regard to this EVEN field for a period corresponding to six fields. Meanwhile with regard to an ODD field, a read pulse XSG1 is generated at time point t2 to read out the odd field once, and then storage is performed for a period corresponding to six fields from time point t3 after a lapse of a period corresponding to two fields, since a time of more than one field is required, as mentioned, for detection of defective pixels in one field, and further the pixel reading order needs to be rendered identical.

Subsequently a read pulse XSG2 is generated at time point t4 when the storage period corresponding to six fields is terminated with regard to the EVEN field, whereby the EVEN field is read out. And detection of defective pixels is executed for a period of more than one field with regard to the even field on the basis of the pixel information thus read out. Meanwhile with regard to the ODD field, the storage period corresponding to six fields is terminated at time point t5 after a lapse of a period corresponding to three fields from time point t4 when the even field is read out, so that the ODD field is read out at this time point t5, and detection of defective pixels with regard to the ODD field is executed on the basis of the pixel information thus read out.

However, in the CCD solid-state image sensor equipped with the wobbling-fault correcting function mentioned above, a long time of more than one field is required for detection of defective pixels in one field due to the fact that the number of vertical lines is larger than that in the ordinary TV system, whereby a time period corresponding to two fields is allocated to such detection. Furthermore, since it is necessary to read out EVEN and ODD fields alternately, a time period corresponding to three fields is required for reading out the next field, hence necessitating a period of five fields in total for the detection.

Normally the process of detecting and correcting defective pixels is executed, in most cases, at the time of initial operation when the power supply for the camera is switched on, so that such process restricts the time until appearance of a picture on the camera after switching on the power supply. Since it is usually necessary to display a picture immediately after the power supply is switched on, the time required for executing the initial operation needs to be minimized, and the initial operation should be performed promptly. Therefore the period required for detection of defective pixels also needs to be minimized, but the detection sensitivity is lowered if the storage time is shortened for reducing the detection period.

SUMMARY OF THE INVENTION

It is an object of the present invention to provide a device capable of detecting defects in a solid-state image sensor within a reduced period of time while causing no deterioration of the detection sensitivity.

According to one aspect of the present invention, there is provided a device for detection of defects in a solid-state image sensor having an image pickup area larger than an effective image pickup area. The device comprises a timing generator for generating first and second read pulses to read out signal charges of first and second fields respectively from photo sensing elements disposed in pixels of the solid-state image sensor; a control means for controlling the timing of generation of the first and second read pulses from the timing generator; and a defect detection means supplied, during a defect detection period, with the signal charges of the first and second fields stored for a predetermined field period in the solid-state image sensor, and serving to detect any defective pixel of the solid-state image sensor by detecting the level of the signal charge in each pixel. During the defect detection period, the control means controls the timing generator in such a manner that the first read pulses for reading out the first-field signal charge is supplied from the timing generator to the solid-state image sensor after storage of the first-field signal charge in the solid-state image sensor for a predetermined field period, and the second read pulses for starting storage of the second-field signal after a lapse of two fields from start of the storage of the first-field signal charge, and for reading out the second-field signal charge after storage of the second-field signal charge in the solid-state image sensor for the predetermined field period are supplied from the timing generator to the solid-state image sensor.

In this device, the defect detection means has a counter means for counting addresses of any defective pixels in the solid-state image sensor, and a memory means for storing the addresses.

This device further comprises a pixel correction means supplied with the signal charge read out from the solid-state image sensor during an image sensing mode, wherein the defect detection means supplies a detection pulse to the pixel correction means at the timing of the address of the defective pixel, and the pixel correction means corrects the defective pixel in response to the detection pulse.

In this device, correction of the defective pixel is executed by replacing the image pickup output of the defective pixel with the image pickup output obtained from the preceding pixel which is immediately before the defective pixel. And the predetermined field period corresponds to a time period of six fields.

According to another aspect of the present invention, there is provided a solid-state image sensing device which comprises a solid-state image sensor having an image pickup area larger than an effective image pickup area; a timing generator for generating first and second read pulses to read out signal charges of first and second fields respectively from photo sensing elements disposed in pixels of the solid-state image sensor; a control means for controlling the timing of generation of the first and second read pulses from the timing generator; a defect detection means having a counter means for counting addresses of any defective pixels in the solid-state image sensor, and a memory means for storing the addresses, the said defect detection means being supplied, during a defect detection period, with the signal charges of the first and second fields stored for a predetermined field period in the solid-state image sensor, and serving to detect the address of any defective pixel of the solid-state image sensor by detecting the level of the signal charge in each pixel; and a defect correction means supplied with the signal charge read out from the solid-state image sensor in an image sensing mode, wherein correction of the defective pixel is executed in response to the detection pulse at the timing of the address of the defective pixel supplied from the defect detection means. During the defect detection period, the control means controls the timing generator in such a manner that the first read pulses for reading out the first-field signal charge is supplied from the timing generator to the solid-state image sensor after storage of the first-field signal charge in the solid-state image sensor for a predetermined field period, and the second read pulses for starting storage of the second-field signal after a lapse of two fields from start of the storage of the first-field signal charge, and for reading out the second-field signal charge after storage of the second-field signal charge in the solid-state image sensor for the predetermined field period are supplied from the timing generator to the solid-state image sensor.

In this solid-state image sensing device, the predetermined field period corresponds to a time period of six fields.

In the device of the above configuration, generation of the read pulse relative to one field is brought to a halt for the predetermined field period in the defect detection mode, so that prolonged storage is performed with regard to one field. And the read pulse relative to the other field is generated at the second field immediately after start of such prolonged storage, whereby the reading that is to be essentially executed with regard to the same field is switched to the reading relative to the other field. And generation of the other-field read pulse is brought to a halt for the predetermined field period, so that prolonged storage is performed with regard to the other field. And upon termination of such prolonged storage, a frame read driving is executed per field, and any defective pixel is detected on the basis of the image pickup output level obtained in the solid-state image sensor at that time. In this frame read driving, it is possible to achieve proper reading of the stored charge in each pixel without mixing of pixels over two fields, hence realizing detection of any defect per pixel within a short period of time.

The above and other features and advantages of the present invention will become apparent from the following description which will be given with reference to the illustrative accompanying drawings.

DESCRIPTION OF THE PREFERRED EMBODIMENT

Hereinafter a preferred embodiment of the present invention will be described in detail with reference to the accompanying drawings.

Figure 1:
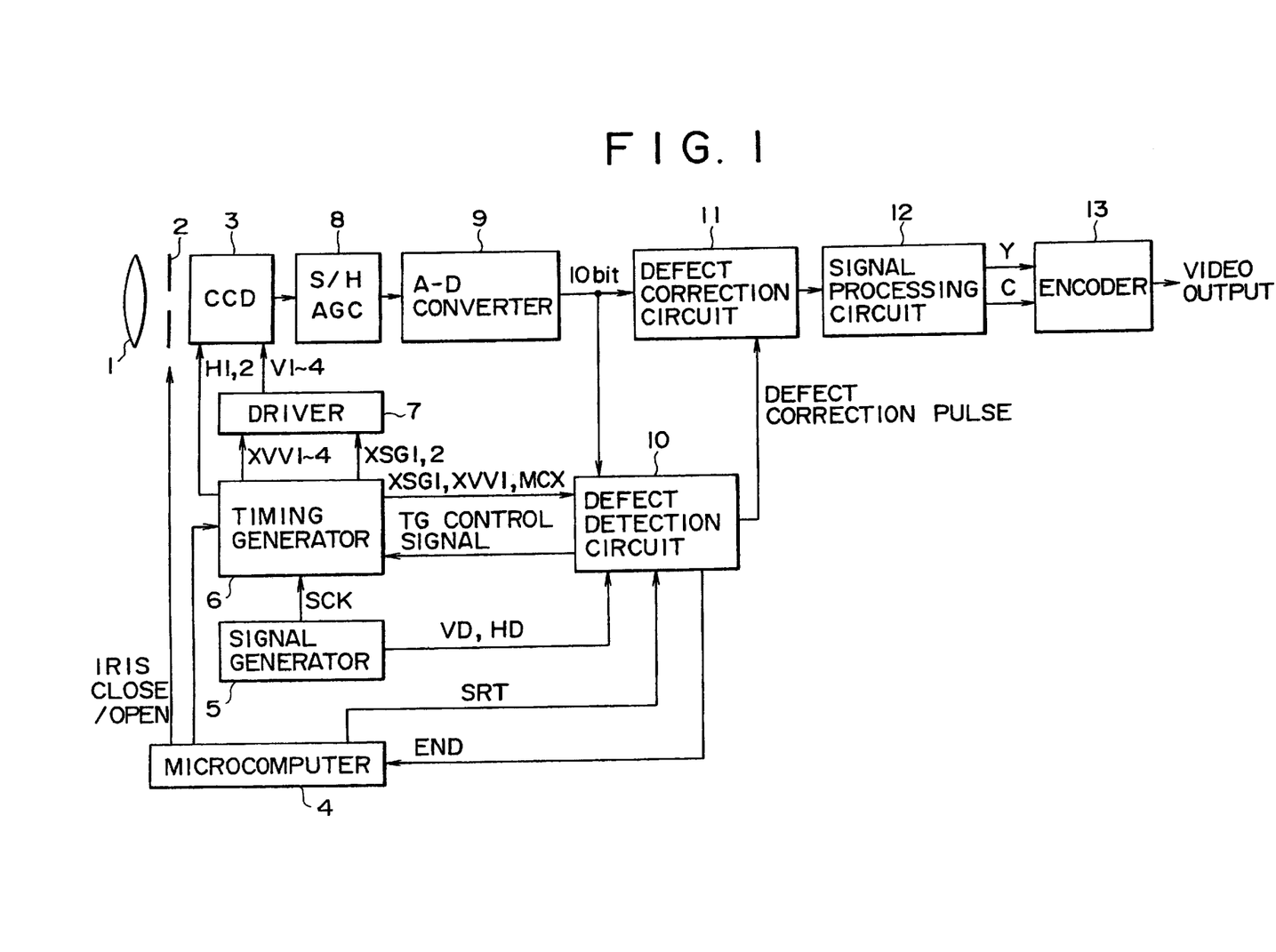
FIG. 1 is a block diagram showing an embodiment of the present invention.

FIG. 1 is a block diagram of an exemplary embodiment of the present invention having, for example, a digital signal processing structure applied to a CCD camera which is equipped with a function to correct a wobbling fault derived from unsteady manual hold of the camera. In FIG. 1, an object to be shot is focused on an image pickup plane of a CCD solid-state image sensor 3 by means of an optical system consisting of a lens 1 and an iris 2. The iris 2 of the optical system is opened or closed under control of a microcomputer 4 in a defect detection/correction mode which will be mentioned later. A signal generator 5 generates a system clock signal SCK serving as a reference for the system operation, a vertical sync pulse VD, and a horizontal sync pulse HD.

A timing generator 6 generates, under control of the microcomputer 4, various signals at proper timings in accordance with the system clock signal SCK supplied thereto from the signal generator 5. For example, the timing generator 6 generates read pulses XSG1 and XSG2 for reading out signal charges from pixels (photo sensing elements) in the CCD solid-state image sensor 3, four-phase vertical transfer pulses XVV1–XVV4 for executing vertical transfer driving, and two-phase horizontal transfer pulses H1 and H2 for executing horizontal transfer driving. As will be mentioned later, the timing generator 6 further serves to change the timings of the read pulses XSG1 and XSG2 in response to a TG control signal supplied from a defect detection circuit 10, thereby forcibly switching the field which is to be read out.

Out of these signals, the read pulses XSG1, XSG2 and the four-phase vertical transfer pulses XVV1–XVV4 are supplied via a driver 7 to a vertical transfer register of the CCD solid-state image sensor 3 as four-phase vertical transfer pulses V1–V4 which include the read pulse XSG1 in the first phase and the read pulse XSG2 in the third phase. Meanwhile the two-phase horizontal transfer pulses H1, H2 are supplied directly to a horizontal transfer register of the CCD solid-state image sensor 3.

Since the CCD solid-state image sensor 3 is so constructed as to be adequate for correction of a wobbling fault caused by unsteady manual hold of the camera, its image pickup area is set to be larger than an effective image pickup area displayed on the screen. In an exemplary case where a television signal of the NTSC system is delivered, there is employed a CCD solid-state image sensor of the PAL system whose number of lines is greater than that in a CCD solid-state image sensor of the NTSC system. As the process of correcting such a wobbling fault is unconcerned directly with the spirit of the present invention, an explanation thereof is omitted here.

The image pickup output of the CCD solid-state image sensor 3 is supplied via an S/H (sample/hold) and AGC (automatic gain control) circuit 8 to an A-D converter 9 so as to be converted into, e.g., 10-bit digital data, which is then supplied to a defect detection circuit 10 and a defect correction circuit 11. The defect-corrected image pickup output obtained from the defect correction circuit 11 is processed in a signal processing circuit 12, which then outputs a luminance (Y) signal and a chroma (C) signal. Thereafter these signals are supplied to an encoder 13 where a video output is produced.

Figure 2:
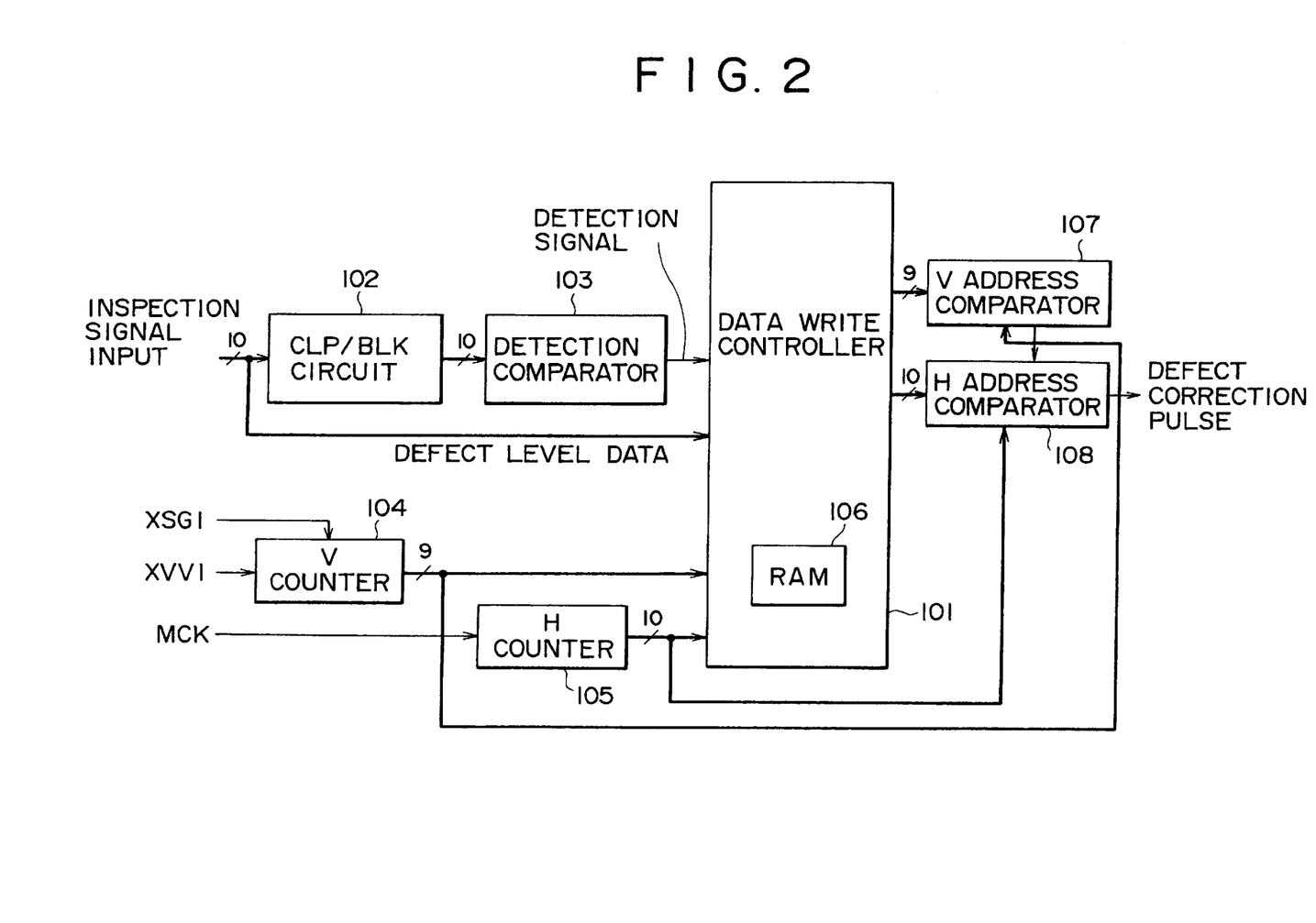
FIG. 2 is a block diagram showing an exemplary concrete configuration of principal components in a defect detection circuit.

FIG. 2 is a block diagram showing an exemplary concrete configuration of principal components in the defect detection circuit 10. In this diagram, the 10-bit image pickup output data obtained from the A-D converter 9 in FIG. 1 is inputted to the defect detection circuit 10 as an inspection signal for defect detection, and also the read pulse XSG1, the first-phase vertical transfer pulse XVV1 and the master clock signal MCK are fed from the timing generator 6 to the defect detection circuit 10. The 10-bit inspection signal is supplied to a data write controller 101 and a CLP (clamping)/BLK (blanking) circuit 102.

In the CLP/BLK circuit 102, there are executed a process of clamping the black level in the video inspection signal, and also a process of blanking any other interval than the effective video period. The inspection signal thus processed through the CLP/BLK circuit 102 is supplied to a detection comparator 103 where a process of detecting any defective pixel is executed. The detection comparator 103 compares the signal level of each pixel with a detection reference level to thereby detect any defective pixel and, upon detection of any defective pixel, supplies an output detection signal to the data write controller 101.

Meanwhile the read pulse XSG1 and the first-phase vertical transfer pulse XVV1 are inputted to a V (vertical) counter 104. The read pulse XSG1 is one synchronized with the vertical sync pulse VD, and the vertical transfer pulse XVV1 is one based on the master clock signal MCK. Therefore, the V counter 104 counts the vertical transfer pulses XVV1 during the period of generation of the read pulse XSG1 to thereby produce count data, which is then outputted as vertical address data. And an H (horizontal) counter 105 counts the master clock pulses MCK to thereby produce count data, which is then outputted as horizontal address data.

In response to each of the detection signals outputted from the detection comparator 103 to signify detection of defective pixels, the data write controller 101 takes in the count data from the V counter 104 and the H counter 105 as address data of the defective pixels, and stores both the address data and the defection level data sequentially in an internal RAM 106. And in a defection correction mode, the data write controller 101 sequentially outputs the address data of the defective pixels stored in the RAM 106. Such address data are fed to a V address comparator 107 and an H address comparator 108.

The V address comparator 107 compares the address data received from the data write controller 101 with the count data from the V counter 104 and, upon detection of a coincidence therebetween, supplies a coincidence detection signal to the H address comparator 108. In response to the coincidence detection signal from the V address comparator 107, the H address comparator 108 compares the address data received from the data write controller 101 with the count data from the H counter 105, and supplies a defect correction pulse upon detection of a coincidence between the compared data, i.e., at the timing of the address of the defective pixel.

The defect correction pulse is supplied to the defect correction circuit 11. In this circuit 11, the image pickup output at the supply instant of the defect correction pulse is specified as the image pickup output relative to the defective pixel, and the preceding image pickup output obtained from the pixel immediately before that is used as the one relative to the defective pixel, whereby defect correction is executed with regard to the defective pixel.

Referring now to a timing chart of FIG. 3, an explanation will be given on the defect detection performed according to this embodiment in the system of the above-described configuration. In this example, the storage time is set to a period corresponding to six fields.

Figure 3:
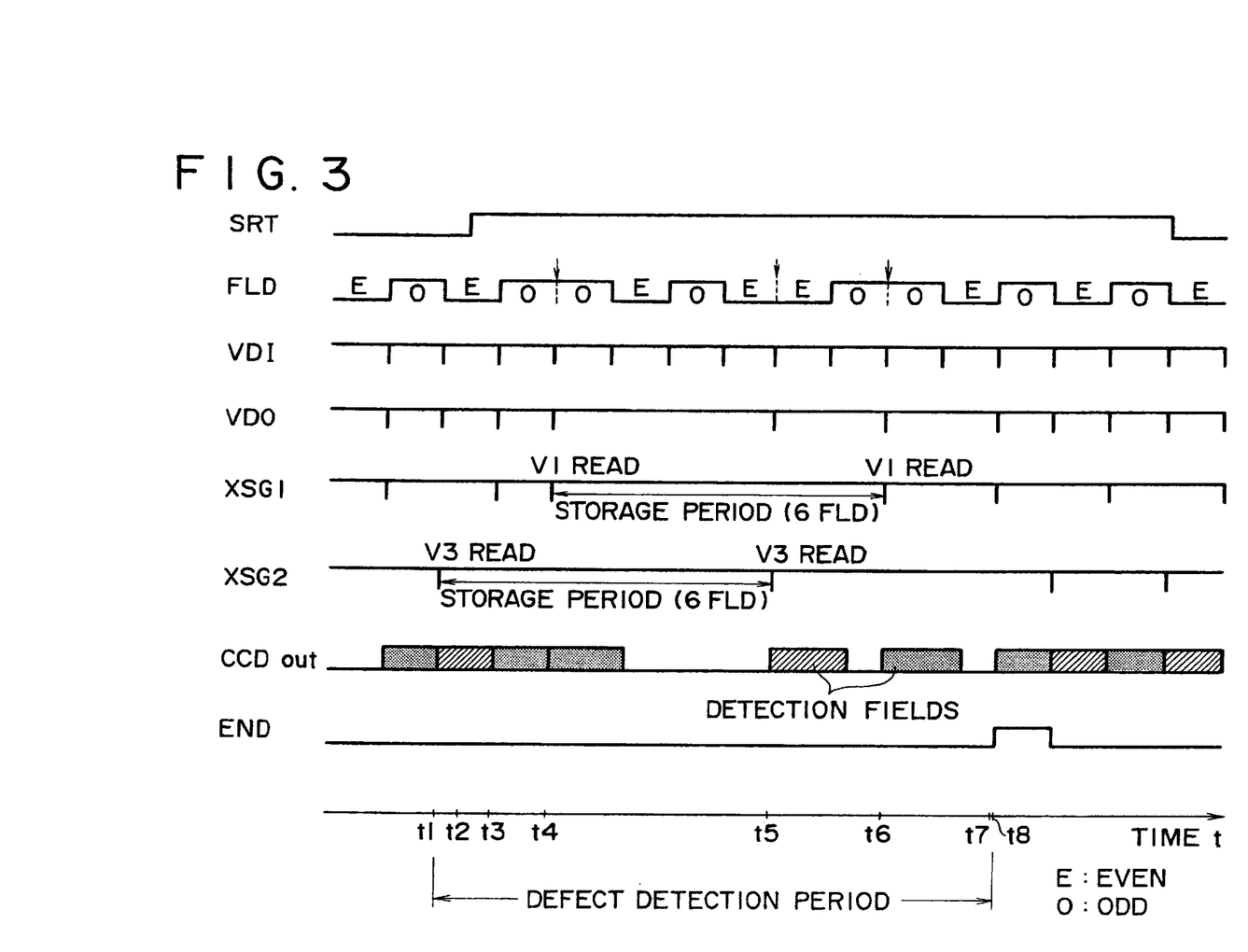
FIG. 3 is a timing chart of signals for explaining the operation of defect detection performed in the present invention.

In FIG. 3, SRT stands for a defect detection start signal supplied from the microcomputer 4 to the defect detection circuit 10, FLD for an ODD/EVEN field discrimination signal, VDI for a vertical sync pulse, VDO for a read timing pulse synchronized with the vertical sync pulse, XSG1 for a read pulse superimposed on a first-phase vertical transfer pulse V1 of four-phase vertical transfer pulses V1–V4 to read out the signal charge of one field, XSG2 for a read pulse superimposed on a third-phase vertical transfer pulse V3 to read out the signal charge of the other field, CCDout for a CCD output signal, and END for a defect detection end signal supplied from the defect detection circuit 10 to the microcomputer 4, respectively.

In FIG. 3, a read pulse XSG2 is generated at time point t1 to read out an EVEN field, and when a high-level start signal SRT is outputted immediately thereafter at time point t2 to command defect detection, storage is started with regard to this EVEN field for a period of six fields in succession to time point t1. And subsequently a read pulse XSG1 is generated at time point t3 to read out an ODD field.

At time point t4 after two fields from start of the storage of the even field, a read pulse XSG1 is generated forcibly instead of primarily reading out the even field, and by switching the fields in this manner, an ODD field is read out in succession to the first field immediately after start of the storage of the even field. Such forcible switching of fields is executed by forcibly changing, in the timing generator 6, the timing of the read pulse XSG1 in response to a TG control signal obtained from the defect detection circuit 10. And storage relative to the ODD field is started at time point t4 for a period corresponding to six fields.

Subsequently a read pulse XSG2 is generated at time point t5 when the storage period corresponding to six fields is terminated with regard to the EVEN field, whereby the EVEN field is read out. And detection of defective pixels is executed for a period of more than one field with regard to the EVEN field on the basis of the pixel information thus read out. Similarly, a read pulse XSG1 is generated at time point t6 when the storage period corresponding to six fields is terminated with regard to the ODD field, whereby the ODD field is read out. And detection of defective pixels is executed for a period of more than one field with regard to the ODD field on the basis of the pixel information thus read out.

Then a read pulse XSG1 is generated again at time point t7 after a lapse of two fields from the ODD field read time point t6, so that the ODD field is read out in succession. And upon termination of detecting defective pixels in both even and ODD fields, a high-level end signal END is outputted at time point t8, and thus a series of the defect detection processes are completed.

As described, in the CCD solid-state image sensor 3 having a function of wobbling fault correction, an operation of primarily reading out one field is forcibly switched to an operation of reading out the other field immediately after two fields from start of the storage of one field, and then storage of that field is started. And after a lapse of the predetermined storage time, the relevant field is read out and then defect detection is executed with regard to that field, and subsequently the normal operation is resumed to consequently realize an advantage that the other field can be read out after two fields from reading one field, whereby the time required for defect detection is reduced to a period corresponding to four fields.

More specifically, the time period required for defect detection in the related art corresponds to five fields, whereas such time period according to the present invention corresponds to four fields, so that a time of one field can be reduced for defect detection. Thus, reduction of the defect detection time is achievable without shortening the storage period relative to each field, hence preventing deterioration of the sensitivity. Further, since the requisite is merely forcible switching of fields, it can be realized by controlling the timing generator 6 alone, and consequently it becomes possible to attain reduction of the initial set time in the CCD camera without changing the detection sensitivity.

Figure 4:
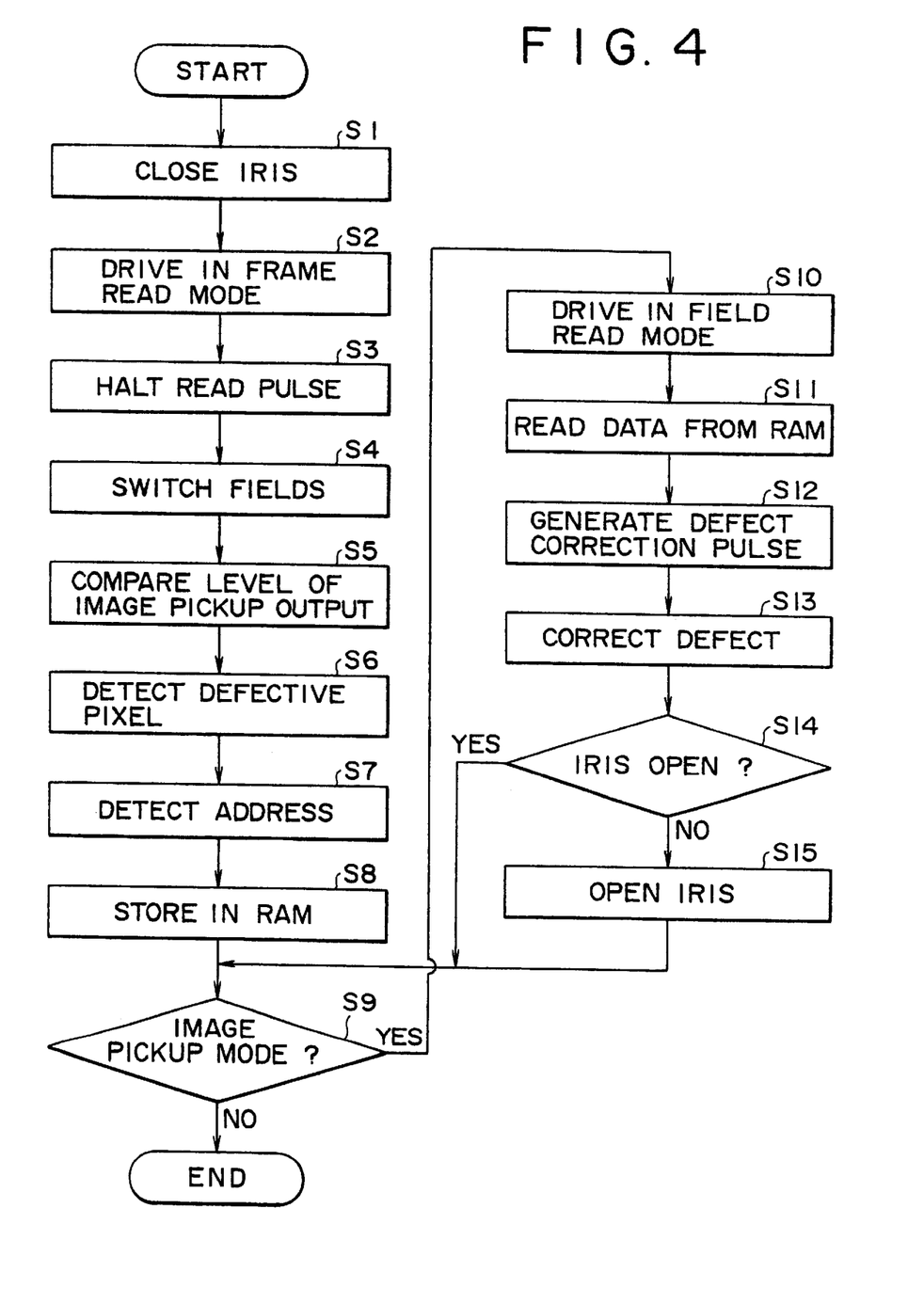
FIG. 4 is a flow chart showing an algorithm of defect detection and defect correction.

Hereinafter an algorithm for defect detection and defect correction will be described with reference to a flowchart of FIG. 4.

When the CCD camera is switched on, first the microcomputer 4 closes the iris 2 to place the CCD solid-state image sensor 3 in a dark state without any incident light thereon (step S1), and then drives the CCD solid-state image sensor 3 in a frame read mode (step S2). Subsequently the microcomputer 4 controls the timing generator 6 to halt generation of read pulses XSG1 and XSG2 supplied to the CCD solid-state image sensor 3 (step S3). Then the operation proceeds to long-time storage. And thereafter a forcible field switching operation, which is the feature of the present invention, is performed (step S4).

Subsequently the image pickup output of the CCD solid-state image sensor 3 is inputted as an inspection signal to the defect detection circuit 10, and the image pickup output level is compared with a predetermined detection reference level (step S5). And any pixel or photo sensing element, whose image pickup output level is in excess of the detection reference level in the CCD solid-state image sensor 3, is detected as a defective pixel (step S6). Simultaneously the address of the relevant defective pixel is detected (step S7), and the address data thereof is stored in the RAM 106 (step S8). Thus, a series of the defect detection processes in the frame read driving are completed.

Upon completion of such defect detection processes, the operation proceeds to a normal image sensing mode where defect correction needs to be executed (step S9). Then the microcomputer 4 controls the timing generator 6 to drive the CCD solid-state image sensor 3 in a field read mode (step S10). And in this field read mode, the defect detection circuit 10 reads out the address data relative to the defective pixel from the RAM 106 (step S11), and generates a defect correction pulse at the timing of the address of the defective pixel (step S12). Such a correction pulse is supplied to the defect correction circuit 11.

When the defect correction pulse is thus supplied, the defect correction circuit 11 specifies, in response to this pulse, the image pickup output relative to the defective pixel in the entire CCD output, and executes defect correction by replacing the image pickup output of the defective pixel with, for example, the image pickup output of the preceding pixel (step S13). Then a decision is made as to whether the lens iris 2 is open or not (step S14) and, if the result of this decision is negative, the iris 2 is opened so that the light is permitted to be incident upon the CCD solid-state image sensor 3 (step S15), and subsequently the operation proceeds to a normal image sensing mode. Thereafter a series of the above defect correction processes are executed repeatedly until termination of the image sensing mode.

In the embodiment mentioned, the signal processing system in the CCD camera is constructed with a digital configuration and, for defect correction, the data of any defective pixel is replaced with that of the preceding pixel. However, it is a matter of course that such replacement of data is not limited to the preceding pixel alone, and the data may be replaced with that of some other peripheral pixel as well. And in case the signal processing system is constructed with an analog configuration, defect correction can be performed through previous value interpolation or the like by means of the S/H circuit.

As described hereinabove, according to the present invention where the solid-state image sensor has an image pickup area larger than an effective image pickup area, generation of a read pulse relative to one field is brought to a halt, during defect detection, for a period corresponding to a predetermined number of fields, and a read pulse relative to the other field is generated after a lapse of two fields from start of such halt. Thereafter, generation of a read pulse relative to the other field is brought to a halt for a period corresponding to a predetermined number of fields, and a frame reading operation is performed per field after termination of such halt period. Consequently, the other field can be read out after a lapse of two fields from reading one field for defect detection, whereby the period required for defect detection is reduced to a period corresponding to a total of four fields, hence achieving reduction of the defect detection period without causing deterioration of the sensitivity. And since the requisite is only forcible switching of fields, the desired action can be realized merely by control of the timing generator.

It is to be understood that the invention is not limited to such embodiment alone, and a variety of other changes and modifications will be apparent to those skilled in the art without departing from the spirit of the invention.

The scope of the invention, therefore, is to be determined solely by the appended claims.

What is claimed is:

1. An apparatus for detecting defects in an imaging system including a solid-state image sensor having an image pickup area larger than an effective image pickup area, said imaging system being operative in a normal mode and a defect detection mode, the apparatus comprising:

a timing generator producing first and second read pulses for reading out signal charges of first and second fields respectively from photo sensing elements disposed in the pixels of said solid-state image sensor;

control means for controlling the timing of the production of the first and second read pulses from said timing generator; and means for detecting a defect while said imaging system is in said defect detection mode, wherein the signal charges of said first and second fields are stored for a predetermined storage period in said solid-state image sensor and the means for detecting a defect detects any defective pixel of said solid-state image sensor during a defect detection period by detecting the level of the signal charge in each pixel;

wherein, when said imaging system is operating in said normal mode first read pulses and second read pulses are supplied to said image sensor at a predetermined periodic rate, and when said imaging system is operating in said defect detection mode read pulses are supplied to said image sensor such that a first read pulse is supplied from said timing generator to said solid-state image sensor for reading out and starting storage of the first-field signal charges for a first predetermined number of field periods and a second read pulse is supplied from said timing generator to said solid-state image sensor after a lapse of two fields from the start of the storage of the first-field signal charge for reading out and starting storage of the second-field signal charges for a second predetermined number of field periods.

2. The apparatus according to claim 1, in which said means for detecting a defect comprises means for determining address data of any defective pixel in said solid-state image sensor and memory means for storing the address data.

3. The apparatus according to claim 2, further comprising means for correcting a defective pixel by reading out and comparing the signal charge of each pixel with a detection reference level wherein said means for detecting a defect supplies a defect correction pulse to said means for correcting a defective pixel and said means for correcting a defective pixel corrects the defective pixel in response to the defect correction pulse.

4. The apparatus according to claim 3, wherein the defective pixel is corrected by replacing the image pickup output of the defective pixel with the image pickup output obtained from the preceding pixel immediately before the defective pixel.

5. The apparatus according to claim 1, wherein said first and second predetermined number of field periods correspond to a time period of six fields.

6. An imaging system that is operative in a normal mode and a defect detection mode, comprising:

a solid-state image sensor having an image pickup area larger than an effective image pickup area;

a timing generator for producing first and second read pulses for reading out signal charges of first and second fields respectively from photo sensing elements disposed in the pixels of said solid-state image sensor;

control means for controlling the timing of the production of the first and second read pulses from said timing generator;

means for detecting a defect comprising means for determining address data of any defective pixel in said solid-state image sensor, and memory means for storing the address data, said means for detecting a defect being supplied during a defect detection period with the signal charges of the first and second fields stored for a predetermined number of field periods in said solid-state image sensor and the means for detecting a defect detecting any defective pixel of said solid-state image sensor by detecting the level of the signal charge in each pixel; and means for correcting a defective pixel by reading out and comparing the signal charge of each pixel with a detection reference level wherein a defective pixel is corrected in response to a defect correction pulse supplied from said means for correcting;

wherein when said imaging system is operating in said normal mode first read pulses and second read pulses are supplied to said image sensor at a predetermined periodic rate, and when said imaging system is operating in said defect detection mode read pulses are supplied to said image sensor such that a first read pulse is supplied from said timing generator to said solid-state image sensor for reading out and starting storage of the first-field signal charges for a first predetermined number of field periods and a second read pulse is supplied from said timing generator to said solid-state image sensor after a lapse of two fields from the start of the storage of the first-field signal charge for reading out and starting storage of the second-field signal charges for a second predetermined number of field periods.

7. The apparatus according to claim 6, wherein said first and second predetermined field periods correspond to a time period of six fields.

8. A method for detecting defects in an imaging system that is operative in a normal mode and a defect detection mode and which includes a solid-state image sensor having an image pickup area larger than an effective image pickup area, comprising the steps of:

producing first and second read pulses for reading out signal charges of first and second fields, respectively, from photo sensing elements disposed in the pixels of said solid-state image sensor;

storing signal charges of said first and second fields for a predetermined number of field periods in said solid-state image sensor;

detecting during a defect detection period the level of the signal charge in each pixel and comparing said level of the signal charge with a detection reference level;

when said imaging system is operating in said normal mode, supplying first read pulses and second read pulses to said image sensor at a predetermined periodic rate; and when said imaging system is operating in said defect detection mode supplying read pulses to said image sensor such that a first read pulse is supplied from said timing generator to said solid-state image sensor for reading out and starting storage of the first-field signal charges for a first predetermined number of field periods and a second read pulse is supplied from said timing generator to said solid-state image sensor after a lapse of two fields from the start of the storage of the first-field signal charge for reading out and starting storage of the second-field signal charges for a second predetermined number of field periods.

* * * * *